(12) United States Patent
Takagaki (10) Patent No.: US 9,193,297 B2
(45) Date of Patent: Nov. 24, 2015

(54) VEHICLE LIGHT DISTRIBUTION CONTROL DEVICE AND VEHICLE LIGHT DISTRIBUTION CONTROL METHOD

(75) Inventor: Tatsuya Takagaki, Nisshin (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/131,596

(22) PCT Filed: Jul. 11, 2012

(86) PCT No.: PCT/IB2012/001365
§ 371 (c)(1),
(2), (4) Date: Jan. 8, 2014

(87) PCT Pub. No.: WO2013/008085
PCT Pub. Date: Jan. 17, 2013

(65) Prior Publication Data
US 2014/0145612 A1  May 29, 2014

(30) Foreign Application Priority Data
Jul. 13, 2011 (JP) ................................ 2011-154913

(51) Int. Cl.
| | |
|---|---|
| *B60Q 1/02* | (2006.01) |
| *B60Q 1/26* | (2006.01) |
| *B60Q 1/14* | (2006.01) |
| *B60Q 1/08* | (2006.01) |
| *B60Q 1/00* | (2006.01) |

(52) U.S. Cl.
CPC ............ *B60Q 1/1423* (2013.01); *B60Q 1/0023* (2013.01); *B60Q 1/085* (2013.01); *B60Q 2300/052* (2013.01); *B60Q 2300/056* (2013.01); *B60Q 2300/41* (2013.01); *B60Q 2300/42* (2013.01)

(58) Field of Classification Search
USPC ........ 315/82, 76–80; 362/487, 459, 460, 465, 362/467, 523, 538
See application file for complete search history.

(56) References Cited

U.S. PATENT DOCUMENTS

| | | | | |
|---|---|---|---|---|
| 8,552,648 | B2* | 10/2013 | Hayakawa | ...................... 315/82 |
| 8,729,803 | B2* | 5/2014 | Yamazaki et al. | ............... 315/82 |
| 8,884,522 | B2* | 11/2014 | Imaeda | ........................... 315/82 |
| 2003/0107323 | A1 | 6/2003 | Stam | |

FOREIGN PATENT DOCUMENTS

| | | |
|---|---|---|
| EP | 1 491 402 A2 | 12/2004 |
| EP | 2 060 441 A1 | 5/2009 |

(Continued)

*Primary Examiner* — Daniel D Chang
(74) *Attorney, Agent, or Firm* — Sughrue Mion, PLLC (57) ABSTRACT

A vehicle light distribution control device includes: an illumination device controlled to change a light distribution pattern among high, low and split beam patterns and of which an optical axis direction is controlled; and a control unit. When a vehicle ahead has been detected, the control unit changes the light distribution pattern to the split beam pattern, and controls a cut-off line position of the split beam pattern so as not to irradiate illumination light to the vehicle ahead. When the vehicle ahead becomes undetectable, the control unit maintains the split beam pattern while controlling the cut-off line position in such a manner that the shielded area of the split beam pattern gradually reduces. After the shielded area becomes smaller than or equal to a predetermined reference, the control unit changes the light distribution pattern from the split beam pattern to the high beam pattern.

10 Claims, 10 Drawing Sheets

(56) References Cited

FOREIGN PATENT DOCUMENTS

| | | |
|---|---|---|
| EP | 2 266 838 A1 | 12/2010 |
| EP | 2 272 714 A2 | 1/2011 |
| EP | 2 295 291 A1 | 3/2011 |
| JP | 01-289727 A | 11/1989 |
| JP | 2011-005992 A | 1/2011 |
| JP | 2011-016505 A | 1/2011 |
| JP | 2011-063070A A | 3/2011 |

* cited by examiner

VEHICLE LIGHT DISTRIBUTION CONTROL DEVICE AND VEHICLE LIGHT DISTRIBUTION CONTROL METHOD

BACKGROUND OF THE INVENTION

1. Field of the Invention

The invention relates to a vehicle light distribution control device and a vehicle light distribution control method.

2. Description of Related Art

There is known an existing technique that, in order not to cause a driver, or the like, of a vehicle ahead, such as a leading vehicle and an oncoming vehicle, to experience glare, a vehicle light distribution control device that controls the light distribution of illumination light for illuminating an area ahead of a vehicle on the basis of a vehicle ahead, detected by a camera, uses a split beam pattern in which part of an area in a high beam pattern is shielded with a boundary set at a cut-off line (for example, see Japanese Patent Application Publication No. 2011-005992 (JP 2011-005992 A) and Japanese Patent Application Publication No. 2011-063070 (JP 2011-063070 A)).

Incidentally, when a detected vehicle ahead becomes undetectable (that is, disappears), the above described vehicle light distribution control device that uses a split beam pattern is required to return the light distribution pattern from the split beam pattern to the high beam pattern. At this time, when the control device is configured to return the light distribution pattern from the split beam pattern to the high beam pattern immediately when a detected vehicle ahead becomes undetectable, chattering due to a repetition of disappearance and detection of a vehicle ahead problematically occurs as in the case where a vehicle ahead momentarily disappears and is detected again thereafter.

In contrast to this, it is also conceivable that, when a detected vehicle ahead becomes undetectable, the light distribution pattern at that point in time is maintained until a set period of time elapses and, when the vehicle ahead is still undetectable after a lapse of the set period of time, the light distribution pattern is returned from the split beam pattern to the high beam pattern.

However, with the above configuration, for a driver, the split beam pattern is maintained until the set period of time elapses although the vehicle ahead has disappeared. Therefore, this may bring a feeling of strangeness to the driver, and also may lead to a decrease in visibility.

SUMMARY OF THE INVENTION

The invention provides a vehicle light distribution control device and vehicle light distribution control method that, when a detected vehicle ahead becomes undetectable, are able to return the light distribution pattern from a split beam pattern to a high beam pattern in such a manner that a feeling of strangeness brought to a driver is reduced.

A first aspect of the invention provides a vehicle light distribution control device. The vehicle light distribution control device includes: an illumination device that irradiates illumination light toward a front of a vehicle, that is controlled such that a distribution pattern is changed among a high beam pattern, a low beam pattern and a split beam pattern in which part of an area in the high beam pattern is shielded with a cut-off line set as a boundary, and that is controlled such that an optical axis direction varies in a substantially horizontal direction; and a control unit that controls the illumination device, wherein, when a vehicle ahead has been detected, the control unit changes the light distribution pattern formed by the illumination device to the split beam pattern, and controls a position of the cut-off line of the split beam pattern so as not to irradiate the illumination light to the vehicle ahead, and, when the vehicle ahead becomes undetectable, the control unit maintains the split beam pattern while controlling the position of the cut-off line of the split beam pattern in such a manner that the shielded area of the split beam pattern gradually reduces, and, after the shielded area becomes smaller than or equal to a predetermined reference, the control unit changes the light distribution pattern from the split beam pattern to the high beam pattern.

A second aspect of the invention provides a vehicle light distribution control method for a vehicle that includes an illumination device that irradiates illumination light toward a front of the vehicle, that is controlled such that a distribution pattern is changed among a high beam pattern, a low beam pattern and a split beam pattern in which part of an area in the high beam pattern is shielded with a cut-off line set as a boundary, and that is controlled such that an optical axis direction varies in a substantially horizontal direction. The vehicle light distribution control method includes: when a vehicle ahead has been detected, changing the light distribution pattern formed by the illumination device to the split beam pattern, and controlling a position of the cut-off line of the split beam pattern so as not to irradiate the illumination light to the vehicle ahead; and, when the vehicle ahead becomes undetectable, maintaining the split beam pattern while controlling the position of the cut-off line of the split beam pattern in such a manner that the shielded area of the split beam pattern gradually reduces, and, after the shielded area becomes smaller than or equal to a predetermined reference, changing the light distribution pattern from the split beam pattern to the high beam pattern.

According to the aspects of the invention, it is possible to provide a vehicle light distribution control device and vehicle light distribution control method that, when a detected vehicle ahead becomes undetectable, are able to return the light distribution pattern from a split beam pattern to a high beam pattern in such a manner that a feeling of strangeness brought to a driver is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
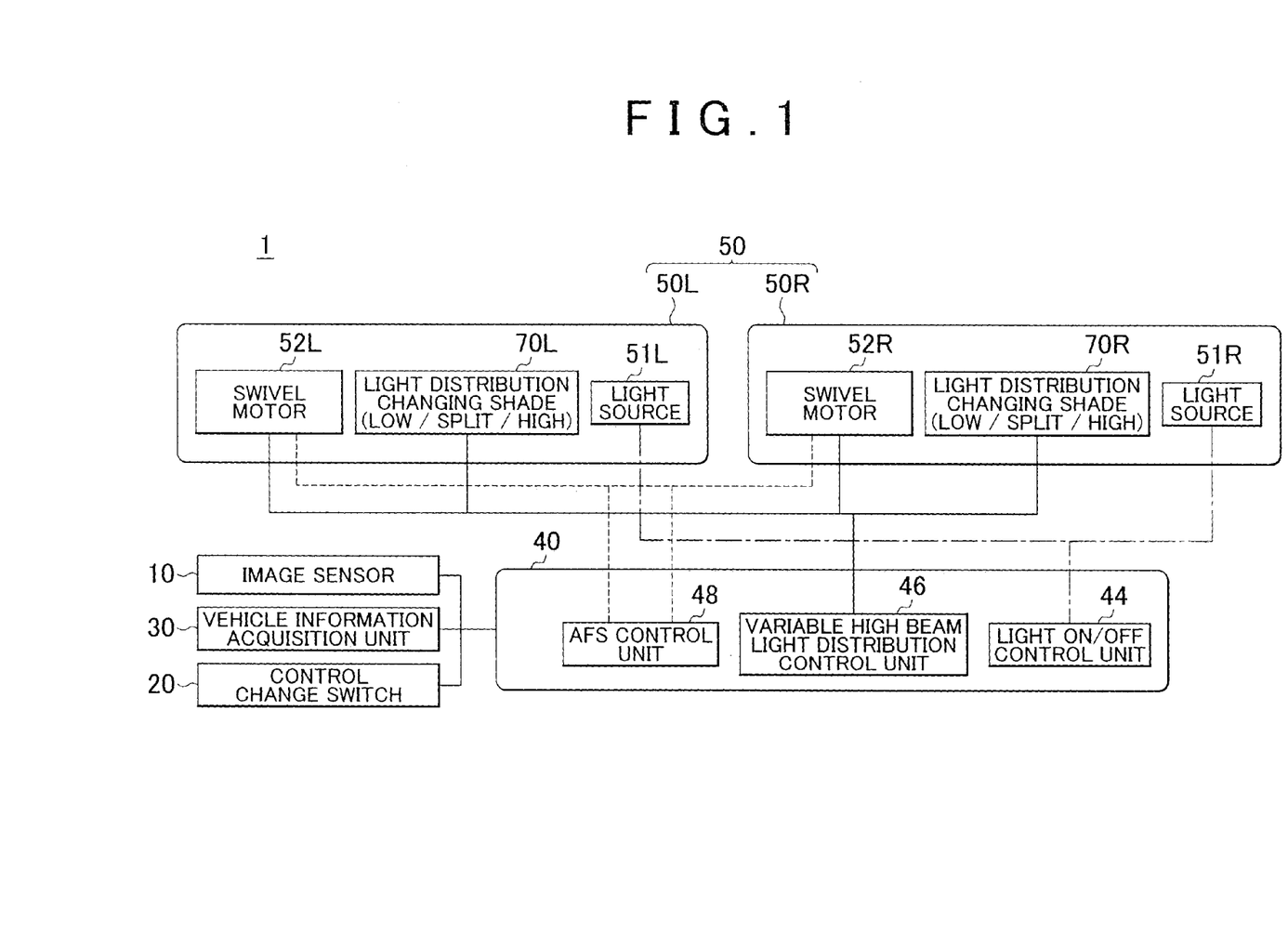
FIG. 1 is a configuration view of a relevant portion of a vehicle light distribution control device according to an embodiment of the invention.

FIG. 1 is a configuration view of a relevant portion of a vehicle light distribution control device 1 according to the embodiment of the invention. The vehicle light distribution control device 1 includes an image sensor 10, a control change switch 20, a vehicle information acquisition unit 30, an electronic control unit (ECU) 40 and right and left head lamps 50.

The image sensor 10 is formed of a camera. The image sensor 10 captures the image of a scene ahead of a vehicle (front environment image) with the use of an imaging device, such as a charge-coupled device (CCD) and a complementary metal oxide semiconductor (CMOS). The image sensor 10 is mounted on a vehicle so as to be able to capture the image of a scene ahead of the vehicle. For example, the image sensor 10 is, for example, installed on the back side (face on the front side of the vehicle) of a rearview mirror. The image sensor 10 may be configured to acquire a front environment image in real time while the vehicle is running and to, for example, supply the acquired front environment image to the ECU 40 in a stream format of a predetermined frame period. Note that the image sensor 10 may be an exclusive sensor for vehicle light distribution control described below or may also be used in another application (for example, a forward looking camera, a camera for lane keep assist, or the like). In addition, the image sensor 10 may be a camera that acquires any one of a color image and a monochrome image.

The control change switch 20 includes switches associated with head lamp operations, such as on/off states of the head lamps 50 and light distribution control on/off states of the head lamps 50. The control change switch 20 may be arranged at an appropriate position, such as a steering column, in a vehicle cabin. Note that light distribution control over the head lamps 50 may be automatically executed at the time when the head lamps 50 are turned on or may be automatically executed at the time when a high beam is used. Note that light distribution control over the head lamps 50 includes light distribution control based on whether a vehicle ahead has been detected and light distribution control based on the travelling direction of the vehicle (host vehicle). Hereinafter, light distribution control based on whether a vehicle ahead has been detected is termed "variable high beam light distribution control", and light distribution control based on the travelling direction of the vehicle is termed "adaptive front-lighting system (AFS) control".

The ECU 40 is formed as a microcomputer that is formed of a CPU, a ROM, a RAM, and the like, that are connected to one another via a bus (not shown). The ECU 40 includes a light on/off control unit 44, a variable high beam light distribution control unit 46 and an AFS control unit 48 as major functions. These units 44, 46 and 48 may be formed of software, hardware or a combination of them. For example, the units 44, 46 and 48 may be implemented such that the CPU executes programs stored in a storage device, such as the ROM. In addition, these units 44, 46 and 48 do not always need to be incorporated into the same ECU unit; instead, these units 44, 46 and 48 may be implemented by cooperation of a plurality of ECUs.

The head lamps 50 are respectively provided at the front right and front left of the vehicle. Note that, in the following description, when the right and left head lamps 50 are specifically distinguished from each other, "R" is suffixed to the reference numerals for the right head lamp and its component elements, and "L" is suffixed to the reference numerals for the left head lamp and its component elements. Each of the head lamps 50 functions as a low beam and a high beam that irradiate visible light toward an area ahead of the vehicle. The low beam and the high beam may be respectively formed by exclusive lamps or may be implemented by changing the position of a light distribution changing shade with the use of a single lamp (see FIG. 2). Each head lamp 50 includes a swivel motor 52 and a light distribution changing shade 70.

Figure 2:
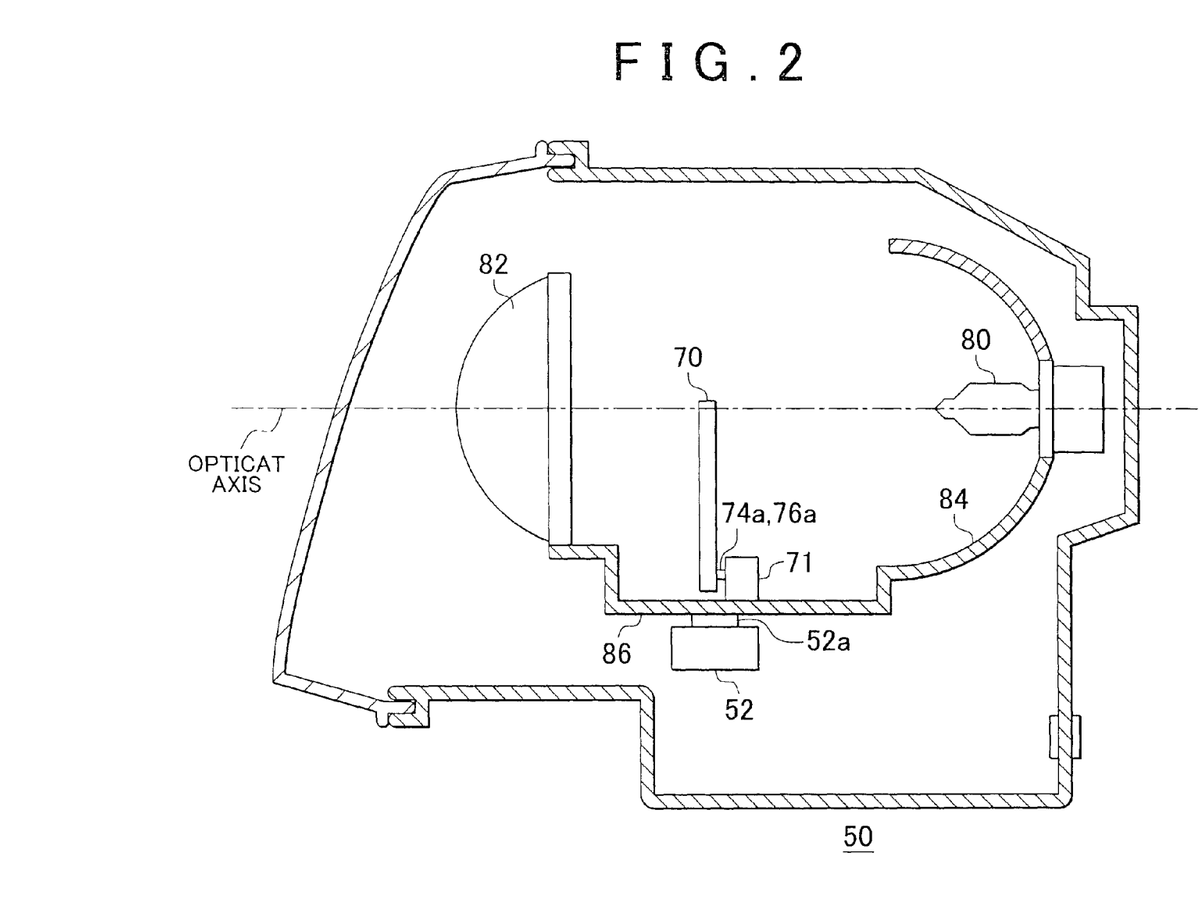
FIG. 2 is a cross-sectional view that schematically shows an example of a head lamp.

FIG. 2 is a cross-sectional view that schematically shows an example of each head lamp 50.

In the example shown in FIG. 2, the head lamp 50 is a projector head lamp, and mainly includes a bulb 80 that constitutes a light source 51, a projector lens 82, a reflector 84 and a holder 86 that holds these components. The light distribution changing shade 70 is provided between the reflector 84 and the projector lens 82. The head lamp 50 causes the reflector 84 to reflect light emitted from the bulb 80, shields part of light heading forward from the reflector 84 with the use of the light distribution changing shade 70, and then projects a light distribution pattern toward the front of the vehicle. The bulb 80 may be an incandescent lamp, a halogen lamp, a discharge bulb, an LED, or the like. The reflector 84 has a reflective surface having a substantially elliptical spherical surface shape. The reflective surface has an optical axis extending in a vehicle longitudinal direction as a central axis. The projector lens 82 is a plano-convex aspherical lens of which the front surface is a convex surface and the rear surface is a flat surface. The projector lens 82 is arranged along the optical axis.

Each head lamp 50 includes the swivel motor 52. The swivel motor 52 changes the direction of the optical axis of a corresponding one of the head lamps 50 within a substantially horizontal plane. The swivel motor 52 is installed at the lower bottom portion of the holder 86, and pivotably supports the holder 86 about a shaft 52a. When the holder 86 is driven for rotation (swiveled) by the swivel motor 52, the direction of the optical axis of the head lamp 50 is changed within the substantially horizontal plane.

Each head lamp 50 includes the light distribution changing shade 70. The light distribution changing shade 70 forms a light distribution pattern in which part of light emitted from the bulb 80 is shielded. The light distribution changing shade 70 is formed of two sub-shades (see FIG. 3A to FIG. 3C). The light distribution changing shade 70 is driven by shade driving actuators 71 so as to control the open/close state of the light distribution changing shade 70. In the illustrated examples, the light distribution changing shade 70 is supported so as to be pivotable about rotation axes 74a and 76b (see FIG. 3A to FIG. 3C), and is driven for rotation by the shade driving actuators 71. The light distribution changing shade 70 is driven for rotation by the shade driving actuators 71 to selectively form at least three types of patterns, that is, a high beam pattern, a low beam pattern and a split beam pattern (see FIG. 4A to FIG. 4C). Examples of the structures and operations (respective patterns) of the shade will be described with reference to FIG. 3A to FIG. 3C, and the like.

Figure 3A:
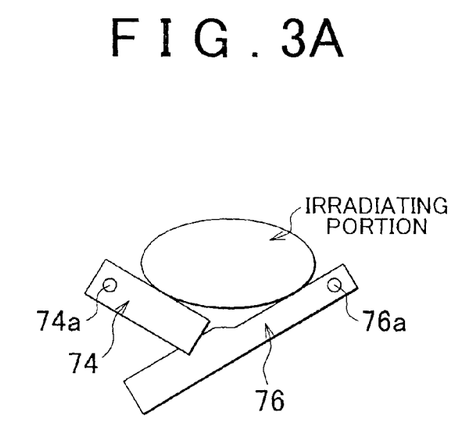
FIG. 3A to FIG. 3C are views that schematically show an example of a light distribution changing shade.
Figure 3B:
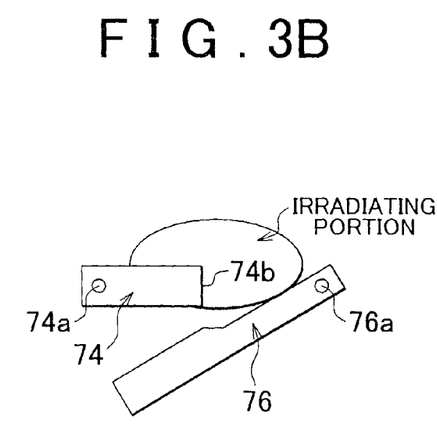
Figure 3C:
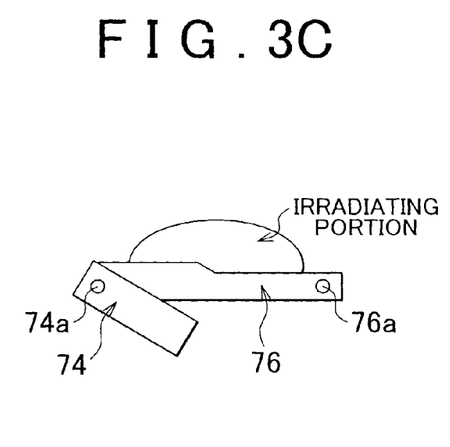

FIG. 3A to FIG. 3C are views that schematically show an example of the light distribution changing shade 70, and are views along the optical axis direction. FIG. 3A to FIG. 3C schematically show the ranges of irradiating portions of the head lamp 50 in relation to the light distribution changing shade 70. Note that the irradiating portion is inverted by the projector lens 82. In FIG. 3A to FIG. 3C, FIG. 3A shows the state of the light distribution changing shade 70 at the time when the high beam pattern is formed, FIG. 3B shows the state of the light distribution changing shade 70 at the time when the split beam pattern is formed, and FIG. 3C shows the state of the light distribution changing shade 70 at the time when the low beam pattern is formed.

The light distribution changing shade 70 shown in FIG. 3A to FIG. 3C includes a one-side high beam shade 74 and a low beam shade 76 as the two sub-shades. The one-side high beam shade 74 has a length such that only the horizontal one side of the lower half of the irradiating portion of the head lamp 50 is shielded. The one-side high beam shade 74 of the right head lamp 50R and the one-side high beam shade 74 of the left head lamp 50L are provided at horizontally opposite sides such that the vehicle center side of each of the head lamps 50R and 50L is shielded. On the other hand, the low beam shade 76 has a length such that the entire horizontal lower half of the irradiating portion of the head lamp 50 is shielded. The one-side high beam shade 74 is supported so as to be rotatable about the rotation axis 74a within a substantially vertical plane (plane vertical to the optical axis). The low beam shade 76 is supported so as to be rotatable about the rotation axis 76a within the substantially vertical plane. The one-side high beam shade 74 and the low beam shade 76 are respectively driven for rotation by the shade driving actuators 71 provided respectively for the one-side high beam shade 74 and the low beam shade 76. By so doing, the one-side high beam shade 74 and the low beam shade 76 each are independently changeable between a retracted position and a shielding position. Note that the one-side high beam shade 74 and the low beam shade 76 may be driven in another mode. The one-side high beam shade 74 and the low beam shade 76 may be, for example, driven by a solenoid or may be driven for translational motion.

Figure 4A:
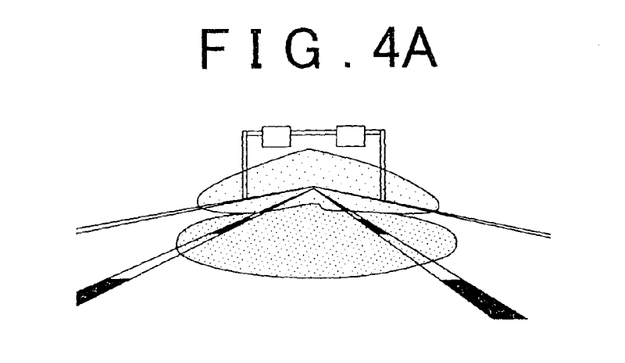
FIG. 4A to FIG. 4C are views that schematically show typical examples of light distribution patterns achieved by the light distribution changing shades.
Figure 4B:
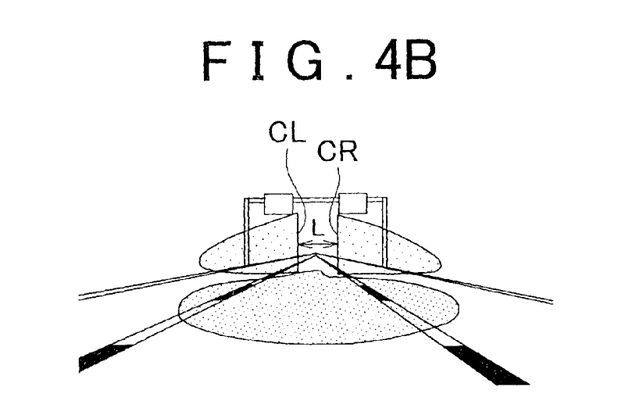
Figure 4C:
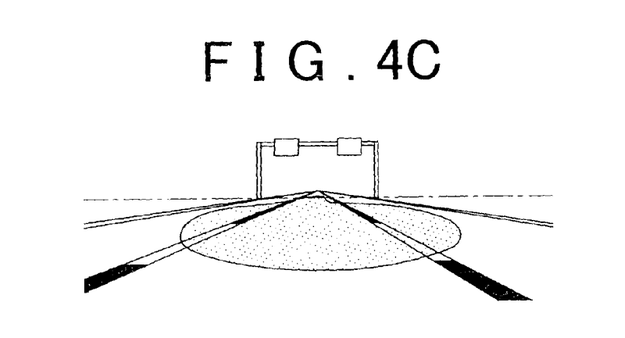

FIG. 4A to FIG. 4C are views that schematically show typical examples of light distribution patterns achieved by the light distribution changing shades 70.

FIG. 4A shows an example of the high beam pattern formed by the head lamps 50. The high beam pattern is formed such that the one-side high beam shades 74 and low beam shades 76 of both the right and left head lamps 50R and 50L are held in the retracted position (see FIG. 3A).

FIG. 4B shows an example of the split beam pattern formed by the head lamps 50. In FIG. 4B, cut-off lines CR and CL that are formed as boundaries by the edges 74b (see FIG. 3B) of the one-side high beam shades 74 are shown. The split beam pattern is formed such that the one-side high beam shades 74 of the right and left head lamps 50R and 50L each are held in the shielding position and the low beam shades 76 of the right and left head lamps 50R and 50L each are held in the retracted position (see FIG. 3B). The split beam pattern is formed such that part of an area in the high beam pattern is shielded with the cut-off lines CR and CL set as boundaries. In the example shown in FIG. 4B, the split beam pattern is formed such that an area adjacent to the vehicle center in the vehicle widthwise direction in the high beam pattern is shielded. The distance L between the cut-off lines CR and CL (that is, a horizontal shielding width L) may be changed (widened or narrowed) by controlling the swivel angles (that is, the directions of the optical axes) of the right and left head lamps 50R and 50L.

FIG. 4C shows an example of the low beam pattern formed by the head lamp 50. The low beam pattern is formed such that the one-side high beam shades 74 of the right and left head lamps 50R and 50L each are held in the retracted position and the low beam shades 76 of the right and left head lamps 50L and 50R each are held in the shielding position (see FIG. 3C).

Figure 5:
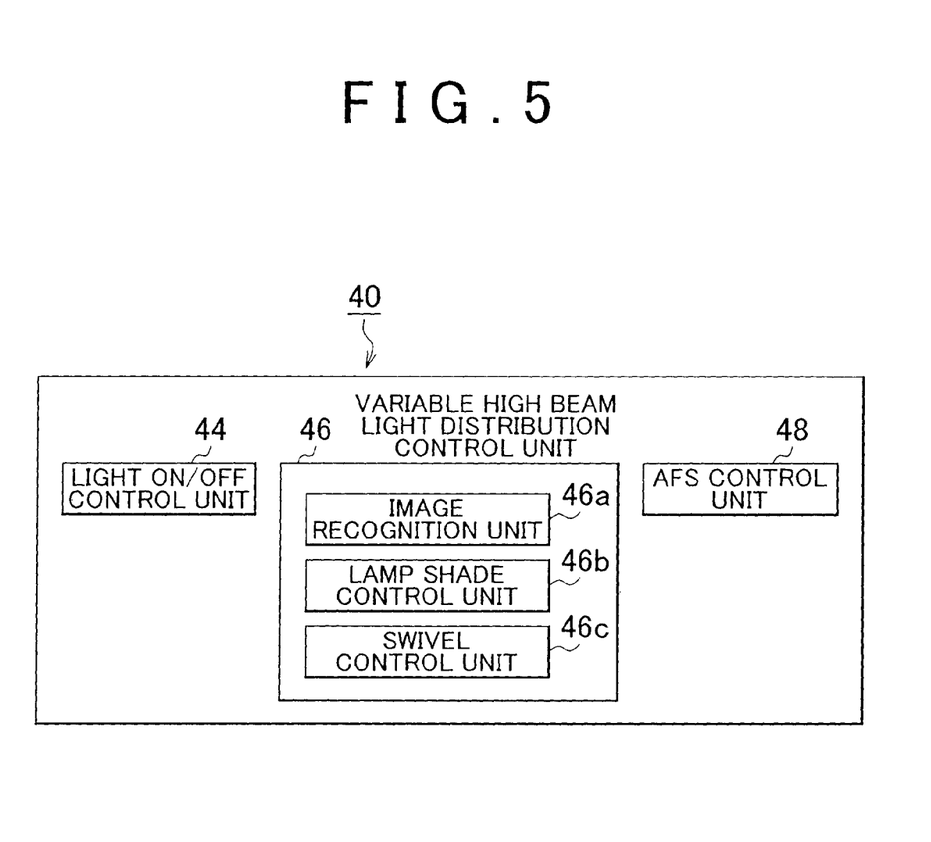
FIG. 5 is a block diagram that shows an example of major functions of an ECU of the embodiment.

FIG. 5 is a block diagram that shows an example of major functions of the ECU 40 of the present embodiment. As described above, the ECU 40 includes the light on/off control unit 44, the variable high beam light distribution control unit 46 and the AFS control unit 48 as major functions.

The light on/off control unit 44 changes the on/off states of the head lamps 50 on the basis of the state of the control change switch 20. Note that the light on/off control unit 44 may execute control to automatically turn on the head lamps 50 when surroundings become dark on the basis of a signal output from a sunshine sensor, or the like.

The variable high beam light distribution control unit 46 executes variable high beam light distribution control under a predetermined condition (described later with reference to FIG. 6) when variable high beam light distribution control is activated on the basis of the state of the control change switch 20. In the variable high beam light distribution control, the light distribution of illumination light for illuminating an area ahead of the vehicle is controlled on the basis of whether a vehicle ahead has been detected to reduce glare experienced by a driver, or the like, of the vehicle ahead.

As shown in FIG. 5, the variable high beam light distribution control unit 46 includes an image recognition unit 46a, a lamp shade control unit 46b and a swivel control unit 46c.

The image recognition unit 46a processes a front environment image obtained from the image sensor 10 to detect a vehicle ahead (a leading vehicle or an oncoming vehicle) that can be present ahead of the vehicle. There are various types of methods of detecting a vehicle ahead in the image, and any method may be employed. Typically, a vehicle ahead is a mobile unit and emits light from a brake lamp (or a tail lamp) and a head lamp, and includes a reflective portion (reflector) at the rear of the vehicle. The reflective portion reflects light received from the rear. Thus, a vehicle ahead in the image may be detected on the basis of the features of those light beams. For example, when the feature of light (high-luminance point) in the image satisfies the predetermined condition (brightness, color, size, the pattern of an edge shape, movement, and the like), an image regarding that light may be detected as a vehicle ahead. More specifically, an example of a method of detecting a vehicle ahead may be as follows. A front environment image obtained from the image sensor 10 is processed to detect light (pixels having a luminance higher than or equal to a predetermined luminance) in the image, and then it is determined whether the light is due to a vehicle ahead or disturbance light other than a vehicle ahead (reflected light due to a reflector of a road sign, or the like) on the basis of elements of brightness and movement of light (for example, the speed, travelling direction, and the like, of an object that emits light) and color (for example, the luminescent color of a brake lamp, the color of reflected light from the reflective portion, or the like) from the detected light. When the image recognition unit 46a has detected the presence of a vehicle ahead, the image recognition unit 46a may calculate the position, direction, and the like, of the vehicle ahead.

The lamp shade control unit 46b controls the light distribution pattern via the shade driving actuators 71. Specifically, the lamp shade control unit 46b controls the light distribution changing shades 70 with the use of the shade driving actuators 71 to control the light distribution pattern of the head lamps 50 on the basis of a situation of the vehicle ahead, detected by the image recognition unit 46a. Basically, the lamp shade control unit 46b controls the open/close states of the one-side high beam shades 74 and low beam shades 76 so as not to irradiate a high beam to the vehicle ahead on the basis of the position, direction, and the like, of the vehicle ahead, detected by the image recognition unit 46a. Note that the details of a control method used by the lamp shade control unit 46b of the variable high beam light distribution control unit 46 will be described later.

The swivel control unit 46c controls the irradiation direction of the distribution pattern (the swivel angles of the head lamps 50) via the swivel motors 52. Specifically, the swivel control unit 46c controls the optical axis directions of the head lamps 50 with the use of the swivel motors 52 on the basis of the situation of the vehicle ahead, detected by the image recognition unit 46a. Basically, the swivel control unit 46c controls the optical axis directions of the head lamps 50 so as not to irradiate a high beam to the vehicle ahead on the basis of the position, direction, and the like, of the vehicle ahead, detected by the image recognition unit 46a. Note that the details of a control method used by the swivel control unit 46c of the variable high beam light distribution control unit 46 will be described later.

The AFS control unit 48 executes AFS control under a predetermined condition (described later with reference to FIG. 6) when AFS control is activated on the basis of the state of the control change switch 20. In the AFS control, the optical axes of the head lamps 50 are directed in a steering wheel steered direction (vehicle travelling direction) on the basis of the steering angle of a steering wheel and a vehicle speed during cornering, or the like, to thereby improve the visibility of the driver. During AFS control, the AFS control unit 48 determines target swivel angles (hereinafter, referred to as AFS control positions) on the basis of the steering angle of the steering wheel and the vehicle speed, and controls the swivel motors 52 (the optical axis directions of the head lamps 50) so that the determined AFS control positions are achieved. Note that any method of determining the AFS control positions may be selected. For example, the AFS control positions may be determined so as to be adapted to the predicted travelling direction of the vehicle a predetermined period of time later (for example, three seconds later) on the basis of the detected steering angle and the detected vehicle speed. In addition, the AFS control positions may be determined so as to be adapted to the predicted travelling direction of the vehicle a predetermined period of time later on the basis of information (the position of the vehicle, the curvature radius of a curve ahead of the vehicle, or the like) from a navigation system in addition to or instead of the steering angle and the vehicle speed. Note that the right and left AFS control positions of the right and left head lamps 50R and 50L may be different from each other.

Figure 6:
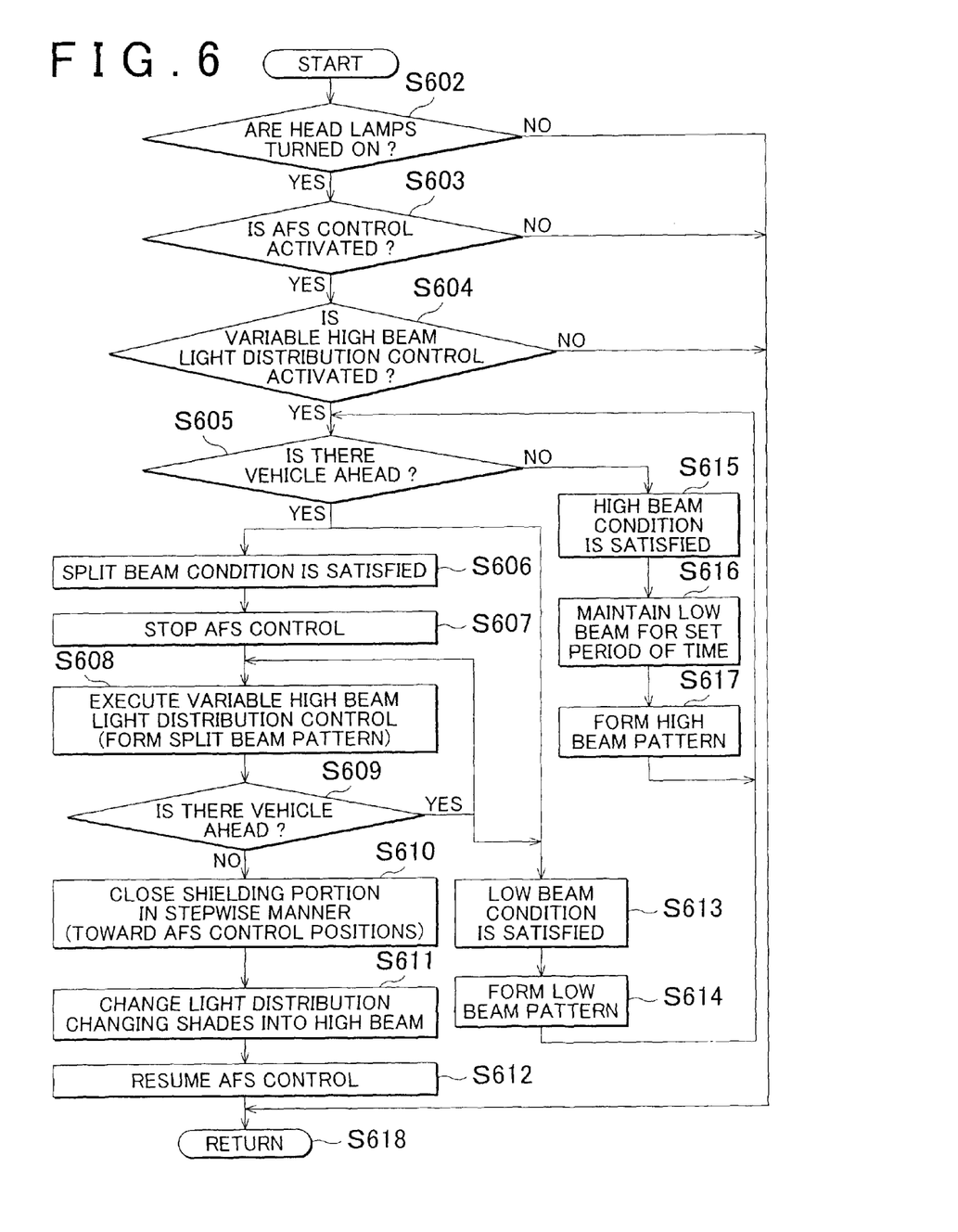
FIG. 6 is a flow chart that shows an example of major processes executed by the ECU of the embodiment.
Figure 7A:
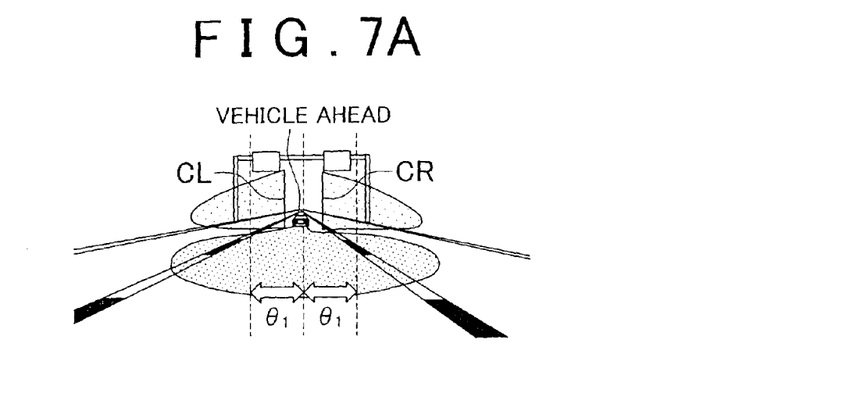
FIG. 7A to FIG. 7C are views that show alternative examples of the light distribution patterns based on the position of a vehicle ahead.
Figure 7B:
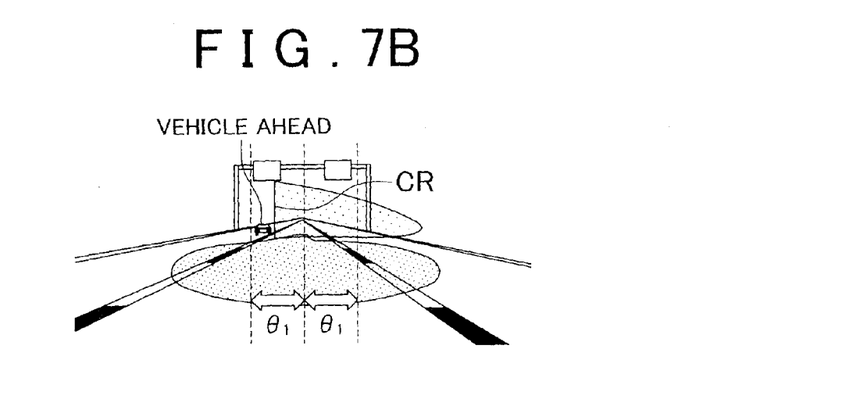
Figure 7C:
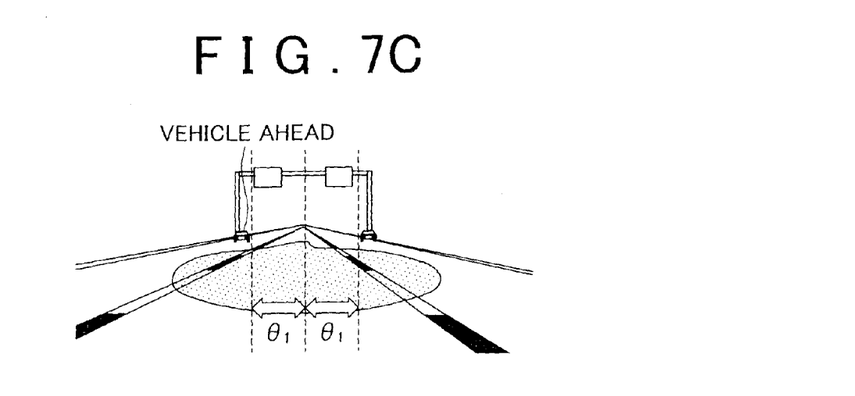

FIG. 6 is a flow chart that shows an example of major processes executed by the ECU 40 of the present embodiment. The processes shown in FIG. 6 may be repeatedly executed at predetermined cycles while the vehicle is running. FIG. 7A to FIG. 7C are views that are associated with the processes shown in FIG. 6, and are views that show alternative examples of the light distribution pattern based on the position ($\theta$) of a vehicle ahead.

In step 602, it is determined whether the head lamps 50 are turned on on the basis of the state of the control change switch 20. When the head lamps 50 are turned on, the process proceeds to step 604; otherwise, the process directly ends, and the next process starts from step 602 in the next processing cycle.

In step 603, it is determined whether AFS control is activated on the basis of the state of the control change switch 20. When AFS control is activated, the process proceeds to step 604; otherwise, the process directly ends, and the next process starts from step 602 in the next processing cycle.

In step 604, it is determined whether variable high beam light distribution control is activated on the basis of the state of the control change switch 20. When variable high beam light distribution control is activated, the process proceeds to step 605; otherwise, the process directly ends, and the next process starts from step 602 in the next processing cycle. Note that, in this example, only when AFS control is activated, variable high beam light distribution control is executable.

In step 606, the image recognition unit 46a of the variable high beam light distribution control unit 46 processes a front environment image provided from the image sensor 10 in real time to determine whether a vehicle ahead (a leading vehicle or oncoming vehicle to be controlled in variable high beam light distribution control) that can be present ahead of the vehicle has been detected. When no vehicle ahead has been detected, the process proceeds to step 615. On the other hand, when a vehicle ahead has been detected, the horizontal position (direction) $\theta$ of the vehicle ahead is calculated, and then the process proceeds to step 606 or step 613 on the basis of the horizontal position $\theta$ of the vehicle ahead. Here, the horizontal position $\theta$ of the vehicle ahead may indicate the transverse position of the vehicle ahead within a sector area prescribed with the travelling direction (longitudinal axis) of the vehicle being set as the center (zero degree). For example, when the absolute value of the horizontal position $\theta$ of the vehicle ahead is smaller than a predetermined angle $\theta 1$, the process proceeds to step 606; whereas, when the absolute value of the horizontal position $\theta$ of the vehicle ahead is larger than the predetermined angle $\theta 1$, the process proceeds to step 613.

In step 606, it is determined that a split beam condition is satisfied, and the process proceeds to step 607. Note that, at this time, a flag that indicates that the split beam condition is satisfied may be set.

In step 607, the AFS control unit 48 stops AFS control or maintains a stopped state of AFS control.

In step 608, the variable high beam light distribution control unit 46 executes variable high beam light distribution control. Specifically, as described above, the lamp shade control unit 46b controls the open/close states (position between the retracted position and the shielding position) of the one-side high beam shades 74 and low beam shades 76 of the respective right and left head lamps 50R and 50L so as not to irradiate a high beam to the vehicle ahead on the basis of the position, direction, and the like, of the vehicle ahead detected by the image recognition unit 46a. In addition, the swivel control unit 46c controls the optical axis directions of the right and left head lamps 50R and 50L (the positions of the cut-off lines CR and CL) so as not to irradiate a high beam to the vehicle ahead on the basis of the position, direction, and the like, of the vehicle ahead, detected by the image recognition unit 46a. For example, the example shown in FIG. 7A shows a situation that the horizontal position $\theta$ of the vehicle ahead is small (the vehicle ahead is located on the same lane on which the host vehicle runs). In this situation, the lamp shade control unit 46b controls the shade driving actuators 71 of the right and left head lamps 50R and 50L such that the right and left head lamps 50R and 50L both form the split beam pattern. In addition, the swivel control unit 46c controls the swivel motors 52 of the right and left head lamps 50R and 50L such that the cut-off line CL of the left head lamp 50L is positioned at a predetermined distance from the left end of the vehicle ahead and the cut-off line CR of the right head lamp 50R is positioned at a predetermined distance from the right end of the vehicle ahead. In addition, the example shown in FIG. 7B is a situation that the horizontal position θ of the vehicle ahead is smaller than the predetermined angle θ1 but is relatively large (the vehicle ahead is located on a lane on the left of the running lane). In this situation, the lamp shade control unit 46b controls the shade driving actuators 71 such that the right head lamp 50R forms the split beam pattern and the left head lamp 50L forms the low beam pattern. In addition, the swivel control unit 46c controls the swivel motor 52 of the right head lamp 50R such that the cut-off line CR of the right head lamp 50R is positioned at a predetermined distance from the left end of the vehicle ahead. Note that, at this time, the swivel angle of the left head lamp 50L may be any angle. The swivel angle of the left head lamp 50L may be fixed at a neutral angle or may be varied on the basis of the swivel angle of the right head lamp 50R.

In step 609, the image recognition unit 46a of the variable high beam light distribution control unit 46 processes a front environment image provided from the image sensor 10 in real time to determine whether the already detected vehicle ahead has been still detected. When the vehicle ahead has disappeared, that is, when the vehicle ahead becomes undetectable, the process proceeds to step 610. On the other hand, when the vehicle ahead has been still detected, the horizontal position (direction) θ of the vehicle ahead is calculated, and, as in the case of the above step 605, the process proceeds to step 608 or step 613 on the basis of the horizontal position θ of the vehicle ahead. In this way, once a vehicle ahead has been detected, variable high beam light distribution control is executed thereafter until the vehicle ahead becomes undetectable (step 608) or the low beam pattern is formed (step 614).

In step 610, the swivel control unit 46c of the variable high beam light distribution control unit 46 controls the positions of the cut-off lines CR and CL of the split beam pattern in such a manner that the shielding portion formed by the split beam pattern closes in a stepwise manner. That is, the swivel control unit 46c controls the positions of the cut-off lines CR and CL of the split beam pattern in such a manner that the shielded area of the whole split beam pattern formed by the right and left head lamps 50R and 50L gradually reduces. In the examples of the light distribution patterns shown in FIG. 4A to FIG. 4C, the swivel control unit 46c controls the swivel motors 52 of the right and left head lamps 50R and 50L such that the horizontal shielding width L defined by the cut-off lines CR and CL gradually reduces.

At this time, the swivel control unit 46c desirably controls the swivel motors 52 of the right and left head lamps 50R and 50L toward the respective AFS control positions. By so doing, it is possible to remove the shielding portion in such a manner that the shielding portion defined by the split beam pattern closes toward the AFS control positions in a stepwise manner. Note that, for this purpose, the AFS control positions may be calculated by background processing also during a stop of AFS control in the above step 607 or may be calculated at the time when negative determination is made in step 609.

Note that a period of time that is taken to close the shielding portion defined by the split beam pattern in a stepwise manner is not an instance but a relatively long period of time (the order of seconds, and, for example, between two and seven seconds). This period of time may correspond to a period of time required to finally determine disappearance of a vehicle ahead or may be adapted in terms of achieving both a time reduction (response) up to a transition into AFS control and reliability of determination as to disappearance of a vehicle ahead.

In step 611, the lamp shade control unit 46b changes the light distribution pattern of the right and left head lamps 50R and 50L to the high beam pattern. At this time, the lamp shade control unit 46b may change the light distribution pattern of the right and left head lamps 50R and 50L to the high beam pattern after the shielding portion defined by the split beam pattern, which closes in a stepwise manner in the above step 610, is smaller than or equal to a predetermined reference. In this case, the predetermined reference may correspond to the minimum of the shielding width L or zero or may correspond to the shielding width L at the AFS control positions. That is, in the latter case, the lamp shade control unit 46b changes the light distribution pattern of the right and left head lamps 50R and 50L to the high beam pattern after the AFS control positions are achieved.

In step 612, AFS control stopped in the above step 607 may be resumed. Note that, when variable high beam light distribution control is ended while the swivel angles are controlled toward the AFS control positions in the above step 611, the AFS control unit 48 is able to quickly resume AFS control. That is, AFS control may be resumed with no substantial transition period from when variable high beam light distribution control is ended. When the process of the step 612 ends, the process starts from step 602 in the next processing cycle. Note that, when the low beam condition or the high beam condition is satisfied in the next cycle (step 613 or step 615), AFS control is actually resumed.

In step 613, it is determined that the low beam condition is satisfied, and the process proceeds to step 614. Note that, at this time, a flag that indicates that the low beam condition is satisfied may be set.

In step 614, the lamp shade control unit 46b changes the light distribution pattern of the right and left head lamps 50R and 50L to the low beam pattern or maintains the light distribution pattern in the low beam pattern (see FIG. 7C). At this time, the AFS control unit 48 may execute AFS control in a state where the low beam pattern is formed.

In step 615, it is determined that the high beam condition is satisfied, and the process proceeds to step 616. Note that, at this time, a flag that indicates that the high beam condition is satisfied may be set.

In step 616, when the low beam pattern is formed at that point in time, the lamp shade control unit 46b maintains the low beam pattern for a set period of time, and then the process proceeds to step 617. On the other hand, when the high beam pattern has been already formed, the process directly proceeds to step 617.

In step 617, the lamp shade control unit 46b changes the light distribution pattern of the right and left head lamps 50R and 50L to the high beam pattern or maintains the light distribution pattern in the high beam pattern. At this time, the AFS control unit 48 may execute AFS control in a state where the high beam pattern is formed.

FIG. 8A to FIG. 8D are views that are associated with the process shown in FIG. 6, and are views that show an example in which the light distribution pattern is changed at the time when a vehicle ahead disappears.

Figure 8A:
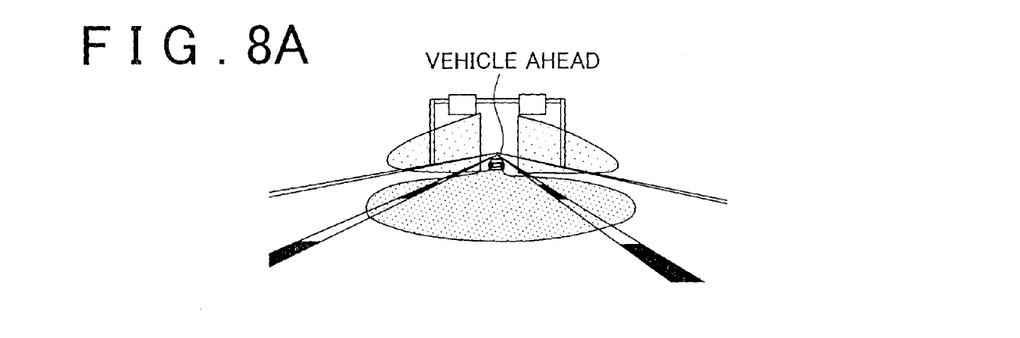
FIG. 8A to FIG. 8D are views that show an example in which the light distribution pattern is changed at the time when a vehicle ahead disappears.
Figure 8B:
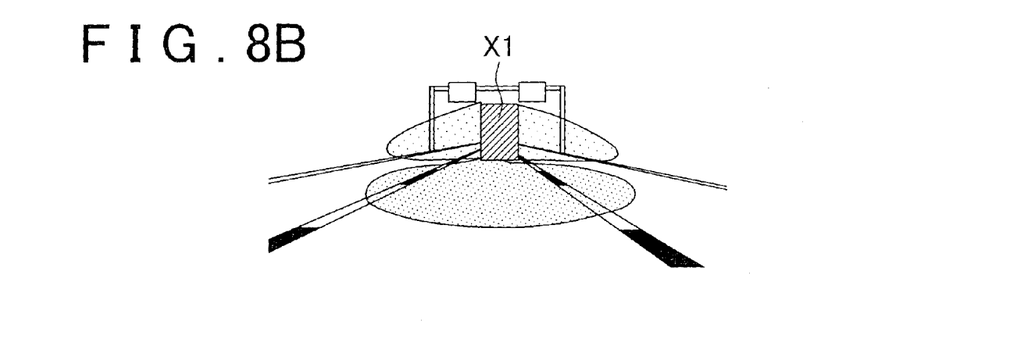
Figure 8C:
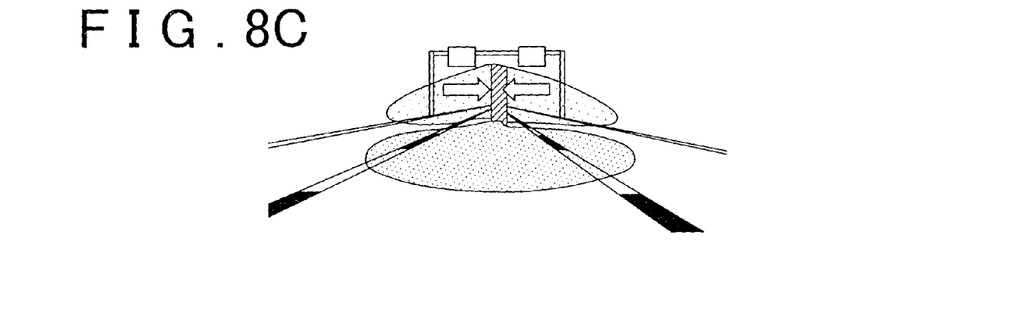
Figure 8D:
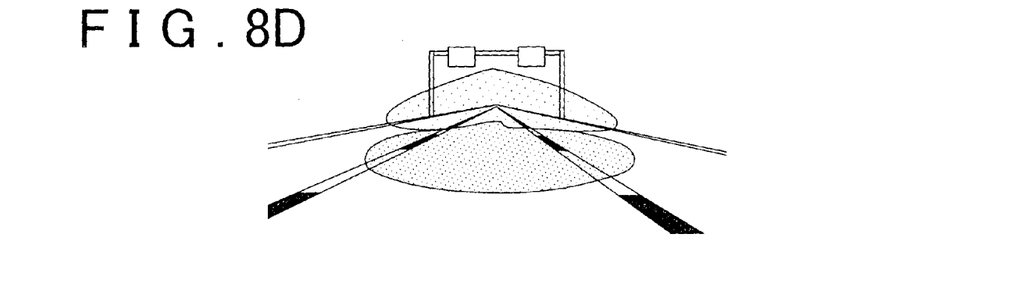

In a situation that a vehicle ahead shown in FIG. 8A has been detected, the split beam pattern is formed so as not to irradiate a high beam to the vehicle ahead, and the positions of the cut-off lines CR and CL of the split beam pattern are controlled (step 608 in FIG. 6). After that, as shown in FIG. 8B, when the detected vehicle ahead becomes undetectable (negative determination is made in step 609 in FIG. 6), the shielded area X1 formed by the right and left head lamps 50R and 50L as the whole split beam pattern makes the driver experience a feeling of strangeness and leads to a decrease in visibility. Therefore, as shown in FIG. 8C, the shielded area X1 is closed in a stepwise manner (step 610 in FIG. 6). In the example shown in FIG. 8A to FIG. 8D, the shielded area X1 finally disappears, and the light distribution pattern is changed to the high beam pattern as shown in FIG. 8D (step 611 in FIG. 6).

In this way, with the process shown in FIG. 6, when a detected vehicle ahead becomes undetectable, the shielded area X1 of the split beam pattern is reduced in a stepwise manner, so it is possible to prevent a feeling of strangeness experienced by the driver and a decrease in visibility. In addition, even if disappearance and detection of a vehicle ahead repeatedly occur as in the case where the vehicle ahead momentarily disappears (disappearance due to a variation in inter-vehicle distance, a shielding object, detection accuracy, or the like) and has been detected again thereafter, the positions of the cut-off lines CR and CL slightly shift accordingly. Therefore, in comparison with the case where the split beam pattern and the high beam pattern are momentarily interchanged, a feeling of strangeness due to chattering may be reduced. Note that a phenomenon that a vehicle ahead becomes undetectable occurs because of a variation in inter-vehicle distance to the vehicle ahead, a variation in relative direction, presence of a shielding object between the vehicle ahead and the host vehicle, or the like, as described above, and excludes a phenomenon that a vehicle ahead is not detected because of a system failure (for example, a failure of the image sensor 10, or the like).

Furthermore, when the shielded area X1 of the split beam pattern is closed toward the AFS control positions in a stepwise manner, it is possible to seamlessly shift from variable high beam light distribution control to AFS control. That is, when AFS control is executed after the light distribution pattern is changed to the high beam pattern, the swivel motors 52 do not need to move the head lamps 50 to the AFS control positions. Therefore, a feeling of strangeness caused by a variation in light distribution is eliminated, and a shift into AFS control may be quick without delay.

However, depending on the AFS control positions, or the like, the shielded area X1 may not be completely eliminated at the AFS control positions. However, in this case as well, when AFS control is executed after the light distribution pattern is changed to the high beam pattern, the amounts by which the head lamps 50 are moved by the swivel motors 52 to the AFS control positions are reduced. Therefore, a feeling of strangeness caused by a variation in light distribution is reduced, and a shift into AFS control may be relatively quick. In addition, in this case, the head lamps 50 may be swiveled to swivel angles at which the shielded area X1 is completely eliminated (angles irrespective of the AFS control positions or angles having a predetermined relationship with the AFS control positions), then the light distribution pattern may be changed from the split beam pattern to the high beam pattern, and, after that, the head lamps 50 may be swiveled to the AFS control positions to shift into AFS control.

Figure 9A:
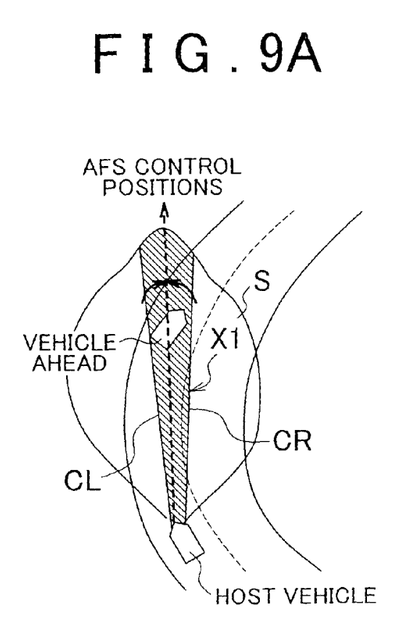
FIG. 9A and FIG. 9B are top views of examples of the relationship between AFS control positions and a shielded area at the time when a vehicle ahead disappears during cornering.
Figure 9B:
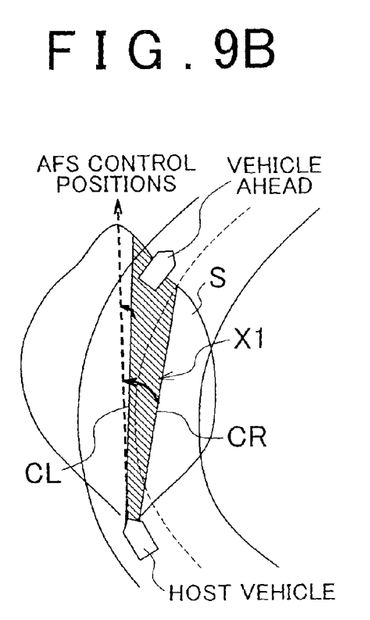

FIG. 9A and FIG. 9B are views that are associated with the process shown in FIG. 6, and are top views that show examples of the relationship between AFS control positions and a shielded area X1 at the time when a vehicle ahead disappears during cornering. In FIG. 9A and FIG. 9B, an irradiated area of the split beam pattern as a whole is indicated by the reference sign S. FIG. 9A shows the case where the AFS control positions at the time when a vehicle ahead disappears are present within the shielded area X1 of the split beam pattern. In this case, at the time when a vehicle ahead disappears, the cut-off lines CR and CL are closed in directions approaching each other as schematically indicated by the arrows in FIG. 9A through the process of step 610 in FIG. 6. FIG. 9B shows the case where the AFS control positions at the time when a vehicle ahead disappears are present outside the shielded area X1 of the split beam pattern. In this case, at the time when a vehicle ahead disappears, the cut-off lines CR and CL are closed while being moved leftward (direction away from the curvature radius center of a curve) as schematically indicated by the arrows in FIG. 9A through the process of step 610 in FIG. 6.

As described above, the embodiment of the invention is described in detail above; however, the aspect of the invention is not limited to the above described embodiment. Various modifications or replacements may be added to the above described embodiment without departing from the scope of the invention.

Figure 10:
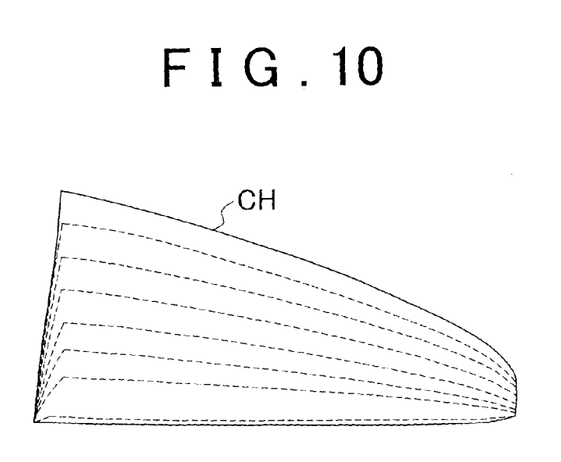
FIG. 10 is a view for illustrating an alternative embodiment of a light distribution changing shade and is a view that shows a split beam pattern.

For example, in the above described embodiment, the light distribution changing shades 70 of which the positions of the cut-off lines CR and CL may be varied by swivel angles are used. In this case, during the process of step 610 in FIG. 6, the open/close states of the light distribution changing shades 70 (positions between the retracted position and the shielding position) remain maintained. However, there are various types of configurations of each of the light distribution changing shades 70 (for example, see Japanese Patent Application Publication No. 2009-227088 (JP 2009-227088 A), Japanese Patent Application Publication No. 2010-000957 (JP 2010-000957 A), or the like), and any configuration may be employed. In addition, each light distribution changing shade may be configured to be slidable laterally. In this case, the process of step 610 in FIG. 6 may be implemented by the sliding operation of each light distribution changing shade. In addition, as shown in FIG. 10, each light distribution changing shade may be configured to change a shielded area in the vertical direction. In FIG. 10, the vertical positions to which the horizontal cut-off line CH is changed are indicated by the dotted lines.

Figure 11A:
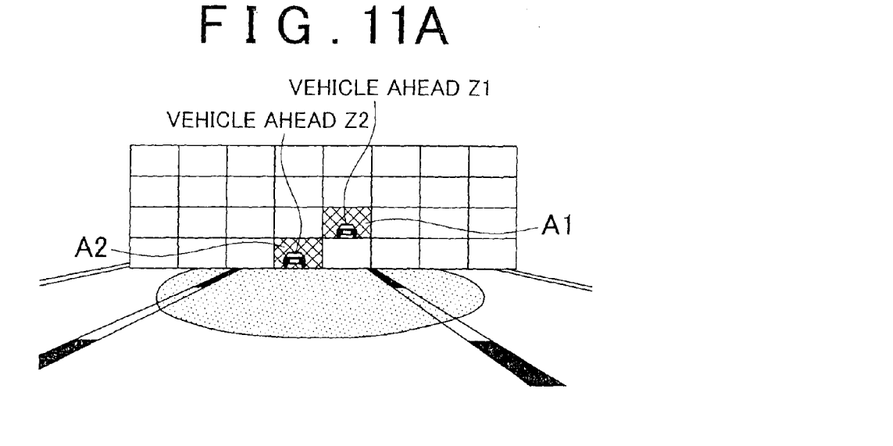
FIG. 11A to FIG. 11C are views that show an alternative embodiment.
Figure 11B:
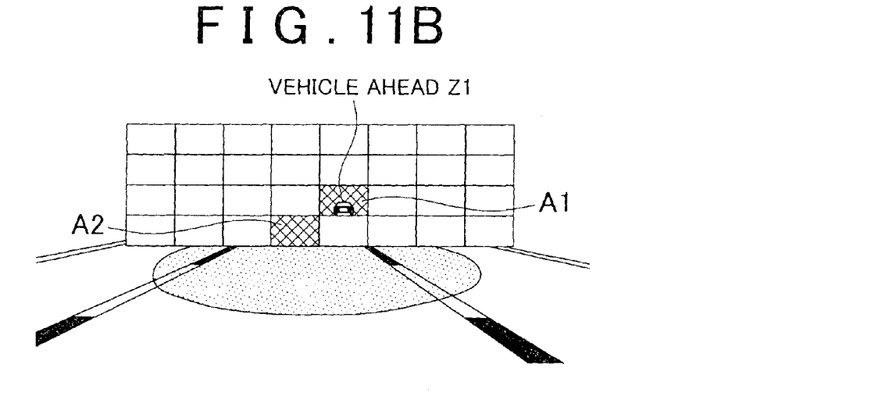
Figure 11C:
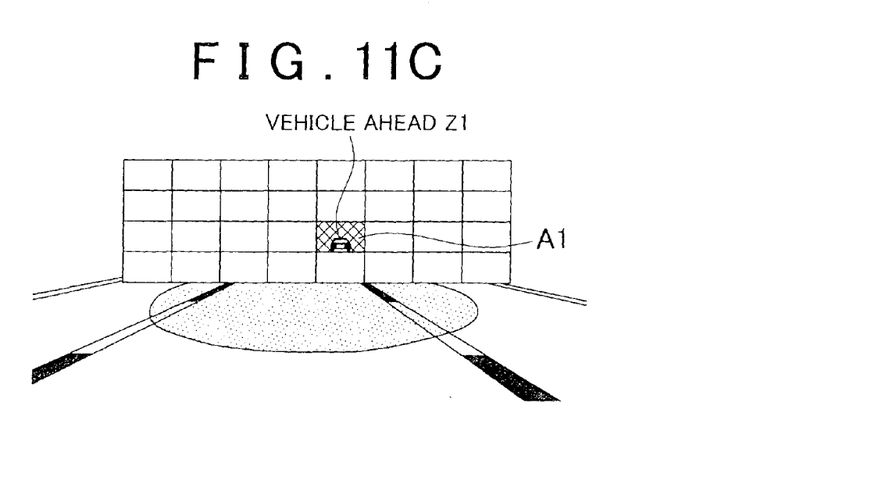

In addition, as shown in FIG. 11A to FIG. 11C, it is also applicable that a high beam irradiation area is divided into multiple areas (in the illustrated example, 8×4) and then those areas are turned on or off (for example, with the use of LED light sources) to thereby make it possible to execute variable high beam light distribution control. In this case, as shown in FIG. 11A, areas A1 and A2 corresponding to vehicles ahead Z1 and Z2 are turned off as shielded areas. Then, as shown in FIG. 11B, when the vehicle ahead Z2 becomes undetectable, light distribution of the area A2 corresponding to the vehicle ahead Z2 may be shifted through PWM control, or the like, from a turn-off state to a turn-on state (FIG. 11C) in a stepwise manner. By so doing, it is possible to reduce a feeling of strangeness over visibility. Note that, in the example shown in FIG. 11A to FIG. 11C, the shielded area is not controlled with the use of the swivel motors 52, so the swivel operations toward the AFS control positions at the time when a vehicle ahead disappears are not required.

The invention claimed is:
1. A vehicle light distribution control device comprising:
an illumination device configured to irradiate illumination light toward a front of a vehicle, the illumination device being controlled such that a light distribution pattern is changed among a high beam pattern, a low beam pattern formed by a low beam shade and a split beam pattern formed by a high beam shade, the split beam pattern being arranged such that part of an area in the high beam pattern is shielded by the high beam shade with boundaries set as cut-off lines, and the illumination device being controlled to swivel such that an optical axis direction varies in a substantially horizontal direction; and a control unit configured to control the illumination device, the control unit being configured to determine a target swivel angle of the illumination device in the substantially horizontal direction based on a steering angle of a steering wheel and a vehicle speed;

the control unit being configured, when a vehicle ahead has been detected, to change the light distribution pattern formed by the illumination device to the split beam pattern, and to control a position of the cut-off line of the split beam pattern so as not to irradiate the illumination light to the vehicle ahead, and the control unit being configured, when the vehicle ahead becomes undetectable, to maintain the split beam pattern while controlling the position of the cut-off line of the split beam pattern in such a manner that a shielded area of the split beam pattern gradually reduces, and, after the shielded area becomes smaller than or equal to a predetermined reference, the control unit being configured to change the light distribution pattern from the split beam pattern to the high beam pattern;

the cut-off line of the split beam pattern being moved in a direction of the target swivel angle to gradually reduce the shielded area and then close the split beam pattern.

2. The vehicle light distribution control device according to claim 1, wherein the control unit is configured, when the vehicle ahead becomes undetectable, to change an optical axis direction of the illumination device in such a manner that a horizontal width of the shielded area of the split beam pattern gradually reduces.

3. The vehicle light distribution control device according to claim 2, wherein the control unit is configured, when the vehicle ahead becomes undetectable, to change the optical axis direction of the illumination device toward a target direction that is set in association with a vehicle travelling direction.

4. The vehicle light distribution control device according to claim 1, wherein the control unit is configured, when the vehicle ahead becomes undetectable, to control the position of the cut-off line of the split beam pattern in such a manner that the shielded area gradually reduces vertically.

5. The vehicle light distribution control device according to claim 1, wherein the control unit is configured, when the vehicle ahead becomes undetectable, to shift light distribution of the shielded area from a shielded state to an unshielded state in a stepwise manner.

6. A vehicle light distribution control method of controlling a vehicle that includes an illumination device that irradiates illumination light toward a front of the vehicle, that is controlled such that a light distribution pattern is changed among a high beam pattern, a low beam pattern formed by a low beam shade and a split beam pattern formed by a high beam shade, the split beam pattern being arranged such that part of an area in the high beam pattern is shielded by the high beam shade with boundaries set as cut-off lines, and that is controlled to swivel such that an optical axis direction varies in a substantially horizontal direction, the vehicle light distribution control method comprising:

determining a target swivel angle of the illumination device in the substantially horizontal direction based on a steering angle of a steering wheel and a vehicle speed;

when a vehicle ahead has been detected, changing the light distribution pattern formed by the illumination device to the split beam pattern, and controlling a position of the cut-off line of the split beam pattern so as not to irradiate the illumination light to the vehicle ahead; and when the vehicle ahead becomes undetectable, maintaining the split beam pattern while controlling the position of the cut-off line of the split beam pattern in such a manner that a shielded area of the split beam pattern gradually reduces, and, after the shielded area becomes smaller than or equal to a predetermined reference, changing the light distribution pattern from the split beam pattern to the high beam pattern, the cut-off line of the split beam pattern being moved in direction of the target swivel angle to gradually reduce the shielded area and then close the split beam pattern.

7. The vehicle light distribution control method according to claim 6, wherein, when the vehicle ahead becomes undetectable, an optical axis direction of the illumination device is changed in such a manner that a horizontal width of the shielded area of the split beam pattern gradually reduces.

8. The vehicle light distribution control method according to claim 7, wherein, when the vehicle ahead becomes undetectable, the optical axis direction of the illumination device is changed toward a target direction that is set in association with a vehicle travelling direction.

9. The vehicle light distribution control method according to claim 6, wherein, when the vehicle ahead becomes undetectable, the position of the cut-off line of the split beam pattern is controlled in such a manner that the shielded area gradually reduces vertically.

10. The vehicle light distribution control method according to claim 6, wherein, when the vehicle ahead becomes undetectable, light distribution of the shielded area is shifted from a shielded state to an unshielded state in a stepwise manner.

* * * * *